No. 823,742. PATENTED JUNE 19, 1906.
C. SCHMIDT.
CARBURETER CONTROL MECHANISM FOR MOTOR VEHICLES.
APPLICATION FILED MAR. 10, 1905.
3 SHEETS—SHEET 1.
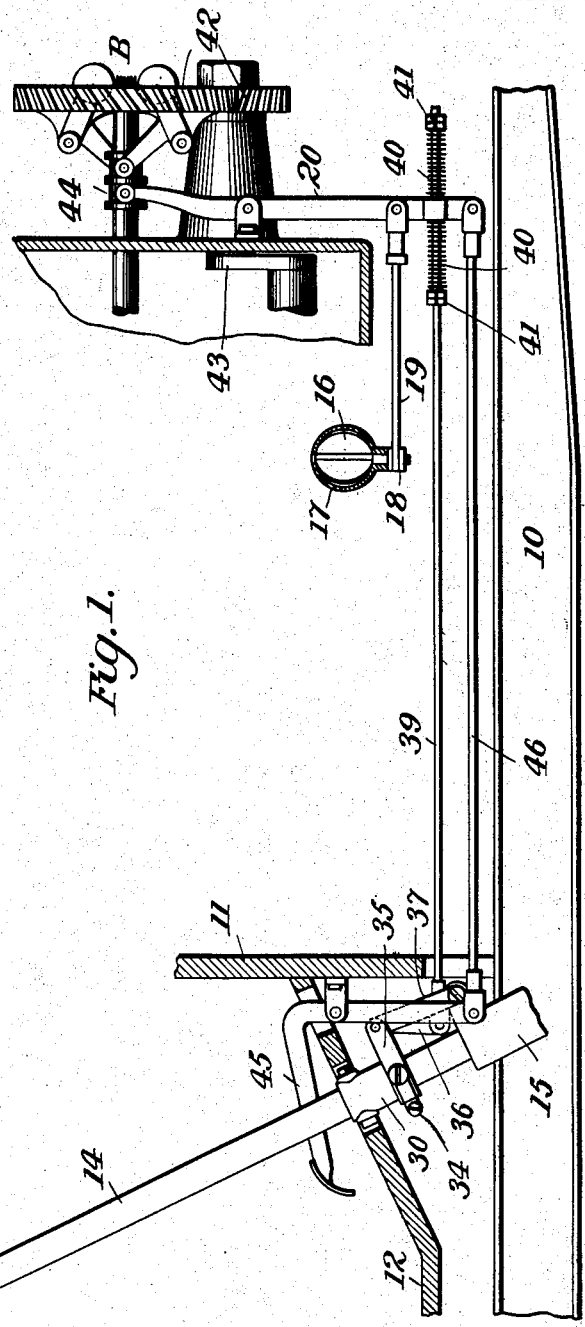
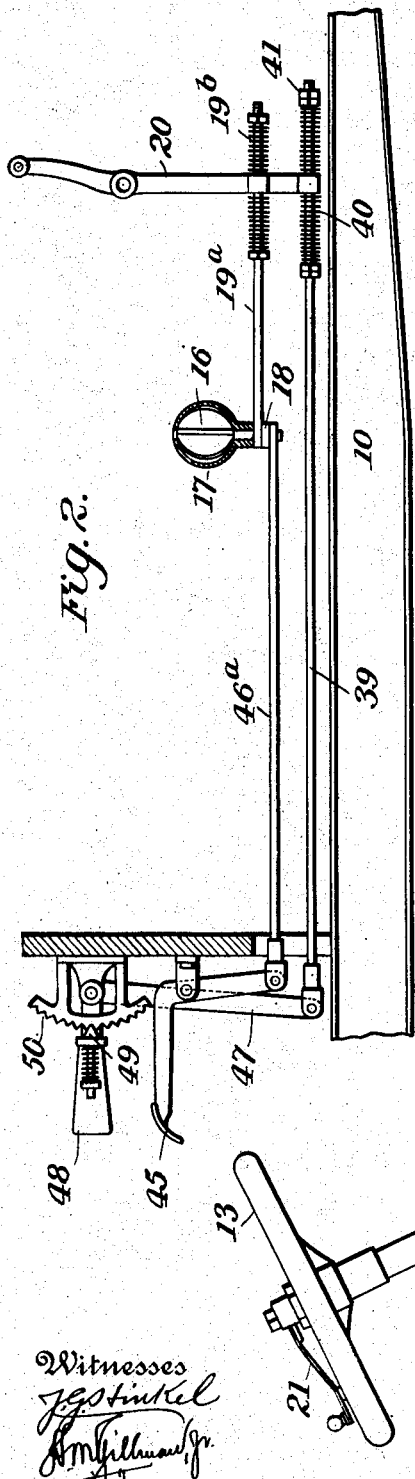
Witnesses
Inventor
Charles Schmidt
By Foster Freeman and Watson
Attorneys No. 823,742. PATENTED JUNE 19, 1906.
C. SCHMIDT.
CARBURETER CONTROL MECHANISM FOR MOTOR VEHICLES.
APPLICATION FILED MAR. 10, 1905.
3 SHEETS—SHEET 2.
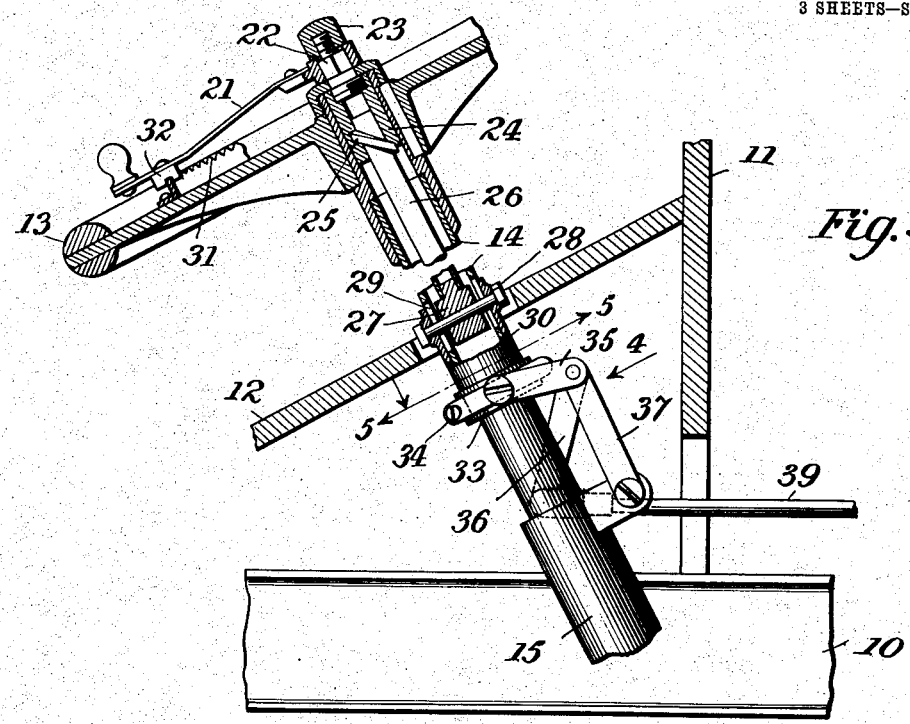
Witnesses
Inventor
Charles Schmidt
By Foster Freeman & Watson
Attorneys

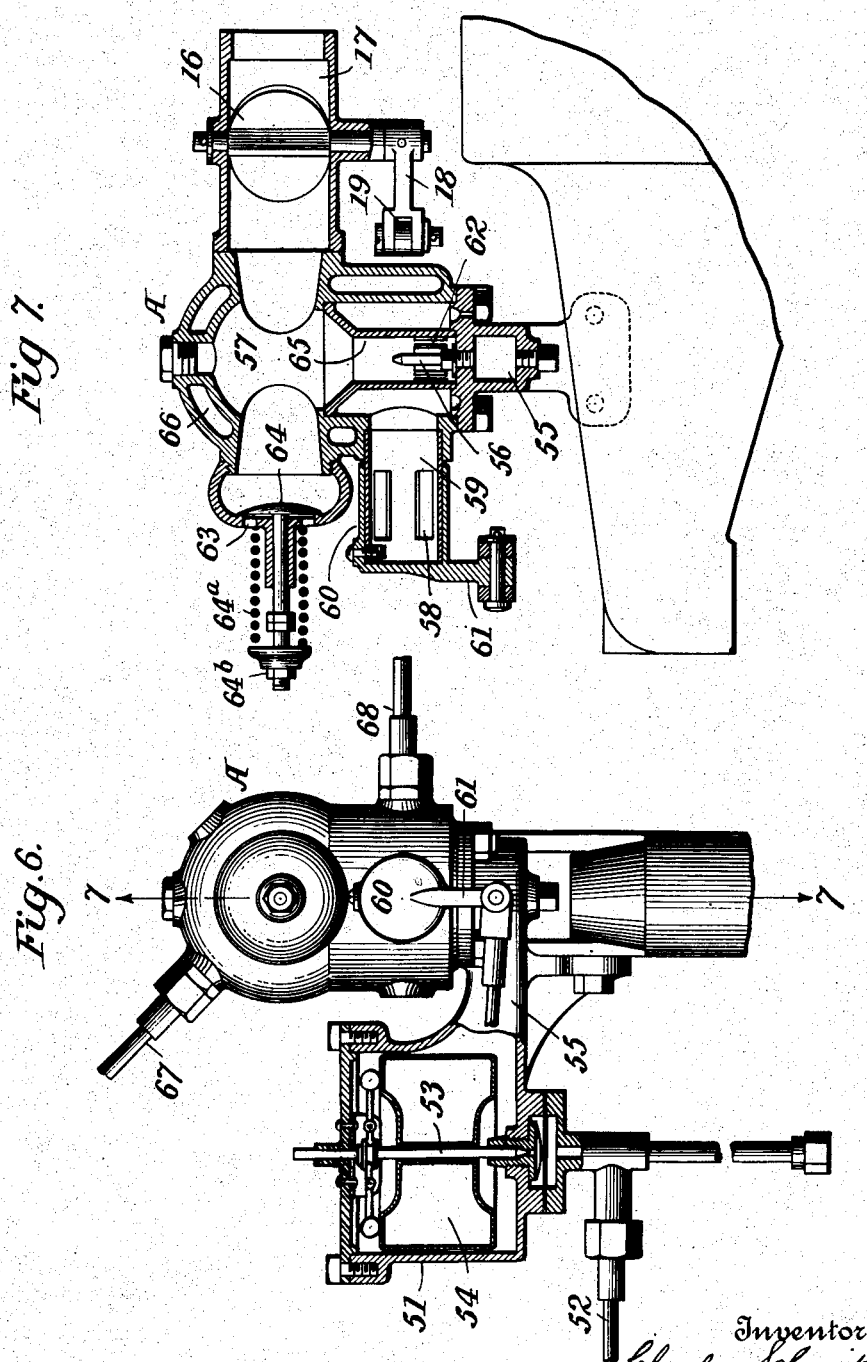

UNITED STATES PATENT OFFICE.

CHARLES SCHMIDT, OF DETROIT, MICHIGAN, ASSIGNOR TO PACKARD MOTOR CAR COMPANY, OF DETROIT, MICHIGAN, A CORPORATION OF WEST VIRGINIA.

CARBURETER-CONTROL MECHANISM FOR MOTOR-VEHICLES.

No. 823,742.      Specification of Letters Patent.      Patented June 19, 1906.

Application filed March 10, 1905. Serial No. 249,441.

*To all whom it may concern:*

Be it known that I, CHARLES SCHMIDT, a citizen of the Republic of France, and a resident of Detroit, Wayne county, State of Michigan, have invented certain new and useful Improvements in Carbureter-Control Mechanism for Motor-Vehicles, of which the following is a specification.

This invention comprises various improvements in carbureters for hydrocarbon-engines such as are used on motor-vehicles, and in means for controlling automatically and otherwise the flow of mixture from the carbureter to the engine. It is often desirable on account of varying atmospheric and climatic conditions to vary the quantity of air which is admitted to the mixing-chamber, and it is also desirable to be able to vary the quantity of mixture of air and hydrocarbon passing to the engine.

The present invention relates to these regulating devices, including means for varying or throttling the mixture passing to the engine both automatically and manually.

The invention will be fully described in connection with the accompanying drawings, in which—

Figure 1 is a side view, partly in section, of the means for regulating the mixture-valve. Fig. 2 is a similar view illustrating a different form of regulating means. Fig. 3 is an enlarged sectional view of a portion of the mechanism shown in Fig. 1. Fig. 4 is a front view of the same looking in the direction of the arrow 4, Fig. 3. Fig. 5 is a section on the line 5 5, Fig. 3. Fig. 6 is a side elevation of the carbureter, the float-chamber being shown in section; and Fig. 7 is a section on the line 7 7, Fig. 6.

Referring to the drawings, 10 indicates a portion of the frame of an automobile, 11 the dashboard, and 12 the footboard. The steering-handle 13 is of usual form and rigidly carried on a hollow shaft 14, which is mounted in a suitable bearing 15.

Referring to Figs. 1 and 7, 16 indicates the mixture-controlling valve, which is located in the pipe 17, leading from the carbureter A to the engine. (Not shown.) The valve 16 is operated by means of an arm 18 and a link 19, the other end of which is connected to a lever 20. Means are provided for setting the lever 20, and consequently the valve 16, in a given position, which may be termed a "normal" position, and additional means are provided for automatically controlling the valve to vary its position from the normal according to the speed of the vehicle or the engine, such means being preferably controlled by a governor. Additional manually-operated means are also provided for shifting the valve from the normal when it is desired to temporarily increase or decrease the speed of the vehicle by opening or closing the throttle. Means for setting the valve at any desired normal position will first be described.

Referring to Figs. 1, 3, 4, and 5, 21 indicates a lever which is rigidly connected to a stud 22 and retained in position thereon by a nut 23. The stud 22 is also rigidly connected to a sleeve 24, which rotates in the upper end of the tube 14 and is provided with a spiral groove 25. Within the sleeve 24 is a rod 26, having a spiral thread adapted to engage the groove 25. The lower end of the rod 26 is provided with a head 27, and a pin 28 passes transversely through said head and through the slots 29 in the tube 14 and is engaged with a sleeve 30, sliding upon the outer surface of the tube 14. When the lever 21 is turned relatively to the handle 13, it rotates the sleeve 24 relatively to the tube 14, and by means of the spiral groove 25 it raises or lowers the rod 26 and the sleeve 30. Suitable means, such as the rack 31 and the tooth 32, are provided for holding the lever 21 in any desired adjustment. As shown, the lever has a spring-arm which normally holds the tooth in engagement with the rack. The sleeve 30 has a circumferential groove 33, in which is fitted a ring 34, having trunnions. 36 indicates an elbow-lever, which is pivotally carried upon the upper end of a link 37, which link is supported on a stationary bracket 38. Horizontal arms 35 of the elbow-lever 36 are connected to the trunnions of the ring 34, while a depending arm of said lever 36 is connected with a rod 39. The rod 39 passes through an eye or opening in the lever 20, and it is normally held in a given relation to said lever by means of opposing springs 40, which are mounted on the rod and held in engagement with the lever 20 by nuts 41. It will be evident that a movement of the lever or arm 21 will raise or lower the rod 26 and the sleeve 30. This movement will rock the elbow-lever 36 and will be communicated through the rod 39, the springs 40, lever 20, and link 19 to the throttle-valve 16, thus setting the throttle-valve in a desired normal position. It will also be evident that the lever 20 may be moved relatively to the rod 39 by reason of the yielding connection between them. Means are provided for effecting temporary adjustment of the valve as follows: The lever 20 is connected with a governor device B, which is operatively connected with the engine. As shown, it is connected by gears 42 with the engine crank-shaft 43, and the governor is provided with a grooved collar 44, engaging directly with an arm of the lever 20. As the speed of the engine increases the lever 20 will be operated in one direction, and as it decreases it will be operated in the opposite direction by the governor in a well-known manner. The tendency of the springs 40, however, will always be to bring the throttle-valve to the normal position, which is controlled by the hand-lever 21. It is desirable to be able to control the speed of the motor to produce a quick temporary increase or decrease of speed in case of emergency and to do this without changing the normal position of the throttle-valve. To accomplish this, the controlling-lever 20 is connected with a lever 45 by a link 46. As the governor is a yielding device, it is possible by raising or lowering the horizontal arm of the lever 45 by the foot or otherwise to adjust the throttle-valve 16 at will. As soon as the lever 45 is released the springs 40 will readjust the throttle-valve 16 to normal position subject to the control of the governor.

In Fig. 2 is shown a different form of the means for setting the throttle-valve. Referring to this figure, it will be seen that the link 39 is connected directly to an elbow-lever 47, having an operating-handle 48. The lever is provided with a suitable spring-pawl 49, which engages with a stationary toothed sector 50 to hold the lever in any desired position. As shown in Fig. 2, the lever 45 is connected directly with the valve-operating arm 18 by the rod $46^a$, and the valve-arm 18 is connected by a link $19^a$ with the lever 20. The connection between link $19^a$ and the lever 20 is a yielding connection consisting of springs $19^b$, confined on the rod $19^a$ and bearing on opposite sides of the lever 20.

In operating the devices shown in Fig. 2 the valve is set to normal position by the lever 47. The foot-lever 45 is pivoted freely and does not affect the position of the valve 16 except when it is positively operated. The spring connection $19^b$ permits the valve 16 to be operated to some extent by the foot-lever 45 without moving the lever 20, which is controlled by the governor and by the locking device 49 50. This prevents in a measure interference between the movements of the governor and the operation of the valve 16 by the foot-lever 45.

Referring to Figs. 6 and 7, 51 indicates the gasolene "float-chamber," into which the gasolene is delivered through a pipe 52. The supply of gasolene is regulated in the usual manner by a valve 53, controlled by a float 54. The gasolene passes from the float-chamber through a conduit 55 to the nozzle 56 in the carbureter proper. From the nozzle 56 it is drawn by suction into the mixing-chamber 57. Air is admitted to the mixing-chamber from inlets 58 in a cylindrical arm or projection 59. The openings 58 are controlled by a cylindrical rocking valve 60, having an arm 61. The valve 60 may be operated either manually or automatically, as desired. The air entering through the valve 60 passes into the mixing-chamber 57 through openings 62, which surround the nozzle 56. This air is drawn in by suction and mingles with the gasolene-spray from the nozzle. When the engine is working at high speed, an additional supply of air is drawn directly into the mixing-chamber 57 through openings 63, which are controlled by a spring-actuated puppet-valve 64. It will be noted that the openings 63 and valve 64 are in direct line with the mixture-discharge conduit 17. The air from the openings 63 is therefore drawn directly through the middle of the mixing-chamber, which insures an effective mingling of the air with the mixture coming from the nozzle 56 and the air-inlets 62. The puppet-valve is controlled by a spring $64^a$, the tension of which is adjustable by means of a nut $64^b$. To prevent direct passage of air from the valve-openings 58 to the mixing-chamber, the nozzle is surrounded by a wall or casing 65, in the lower portion of which the openings 62 are formed. The casing of the carbureter A is preferably provided with passages 66, through which hot gases or hot water may be circulated to warm the carbureter and assist in vaporizing the hydrocarbon. The passages 66 are shown as having an inlet 67 and an outlet 68.

It will be evident that the various means described may be embodied in other mechanical forms than those shown without departing from the spirit and scope of the present invention. The forms illustrated are those deemed best at the present time; but it will be understood that the invention is not limited to the precise mechanism illustrated and described.

No claim is herein made to the carbureter described and illustrated, as the same forms the subject-matter of a divisional application.

Having described my invention, what I claim, and desire to secure by Letters Patent, is—

1. The combination with a mixer and vaporizer, of a mixture-valve, means for locking said valve yieldingly against movement in either direction from a given position, and means governed by the speed of the engine for regulating the opening and closing of said valve without disturbing said locking means.

2. The combination with a mixer and vaporizer, of a mixture-valve, means for locking said valve yieldingly against movement in either direction from a given normal position, a governor, and means connecting said governor with said valve whereby the valve is automatically moved in either direction from its normal position without disturbing said locking means.

3. The combination with a mixer and vaporizer, of a mixture-valve, means for locking said valve yieldingly against movement in either direction from a given normal position, means controlled by the speed of the engine for adjusting said valve in either direction from its normal position without disturbing said locking means, and manually-operated means for adjusting said valve without disturbing said locking means.

4. The combination with a mixer and vaporizer, of a mixture-valve controlling the discharge from said mixer and vaporizer, means including an elastic connection for locking said valve against movement in either direction from a given normal position, a governor, and connections for adjusting said valve automatically without disturbing said locking means, said elastic connection permitting the valve to be moved in either direction from its normal position.

In testimony whereof I have signed my name to this specification in the presence of two subscribing witnesses.

CHARLES SCHMIDT.

Witnesses:
RUSSELL HUFF,
MARK C. TAYLOR.